US011691326B2

(12) United States Patent
Mientkewitz et al.

(10) Patent No.: US 11,691,326 B2
(45) Date of Patent: Jul. 4, 2023

(54) METHOD AND TOOL FOR MANUFACTURING A PLASTIC CONTAINER, IN PARTICULAR A FUEL CONTAINER, BY MEANS OF INTERNAL PRESSURE FORMING

(71) Applicant: VOLKSWAGEN AKTIENGESELLSCHAFT, Wolfsburg (DE)

(72) Inventors: Claudia Mientkewitz, Ronnenberg (DE); Ralf Berlin, Gardelegen (DE)

(73) Assignee: Volkswagen Aktiengesellschaft ( * ) Notice: Subject to any disclaimer, the term of this patent is extended or adjusted under 35 U.S.C. 154(b) by 152 days.

(21) Appl. No.: 17/257,791

(22) PCT Filed: Jun. 27, 2019

(86) PCT No.: PCT/EP2019/067105
§ 371 (c)(1),
(2) Date: Jan. 4, 2021

(87) PCT Pub. No.: WO2020/007695
PCT Pub. Date: Jan. 9, 2020

(65) Prior Publication Data
US 2021/0299934 A1 Sep. 30, 2021

(30) Foreign Application Priority Data
Jul. 5, 2018 (DE) ................. 10 2018 211 136.7

(51) Int. Cl.
B29C 49/42 (2006.01)
B29C 49/04 (2006.01)
(Continued)

(52) U.S. Cl.
CPC .......... B29C 49/4278 (2013.01); B29C 49/04 (2013.01); B29C 49/18 (2013.01);
(Continued)

(58) Field of Classification Search
CPC ....... B29C 49/04; B29C 51/105; B29C 49/18; B29C 49/30; B29C 49/50; B29C 49/20;
(Continued)

(56) References Cited

U.S. PATENT DOCUMENTS 3,452,391 A 7/1969 Langecker
3,635,632 A 1/1972 Shaw et al.
(Continued)

FOREIGN PATENT DOCUMENTS

BE 705229 A 3/1968
CN 1748982 A 3/2006
(Continued)

OTHER PUBLICATIONS

Search Report for International Patent Application No. PCT/EP2019/067105; dated Oct. 8, 2019.
(Continued)

Primary Examiner — Monica A Huson
(74) Attorney, Agent, or Firm — Barnes & Thornburg, LLP

(57) ABSTRACT

A method for manufacturing a plastic container by internal pressure forming including positioning a tubular preform between the die parts of a molding die having a die cavity; closing the molding die and forming or preforming a container from the preform using internal pressure, wherein a peripheral portion of the preform is pressed out of the die cavity through a die gap; laterally withdrawing the peripheral portion pressed out of the die cavity, as a result of which the container is divided into two container halves; and thermally separating plastic bridges and/or plastic threads which arise during the lateral withdrawal of the peripheral portion. Also disclosed is a molding die suitable for carrying out the method.

19 Claims, 4 Drawing Sheets

(51) Int. Cl.
  *B29C 49/18* (2006.01)
  *B29C 49/30* (2006.01)
  *B29C 49/48* (2006.01)
  *B29C 49/50* (2006.01)
  *B29K 23/00* (2006.01)
  *B29L 31/00* (2006.01)

(52) U.S. Cl.
  CPC .......... *B29C 49/30* (2013.01); *B29C 49/4802* (2013.01); *B29C 49/50* (2013.01); *B29C 49/4812* (2022.05); *B29C 2049/4805* (2013.01); *B29C 2793/0063* (2013.01); *B29C 2793/0072* (2013.01); *B29K 2023/065* (2013.01); *B29L 2031/7172* (2013.01)

(58) Field of Classification Search
  CPC ............ B29C 49/4802; B29C 49/4278; B29C 49/4812; B29C 2793/0081; B29C 2793/0063; B29C 2793/0072; B29C 2049/2008; B29C 2793/009; B29C 2049/4805; B29C 2049/023; B29L 2031/7172; B29K 2023/065
  See application file for complete search history.

(56) References Cited

U.S. PATENT DOCUMENTS

| | | | |
|---|---|---|---|
| 3,939,236 A * | 2/1976 | Hahn | ...................... B29C 49/48 264/DIG. 1 |
| 7,244,388 B2 | 7/2007 | Kummer | |
| 8,951,461 B2 | 2/2015 | Heim et al. | |
| 9,073,245 B2 * | 7/2015 | Bocker | ............... B29C 49/2408 |
| 9,511,530 B2 | 12/2016 | Vanmarcke et al. | |
| 9,592,631 B2 | 3/2017 | Boecker et al. | |
| 2002/0146481 A1 | 10/2002 | Wust | |
| 2007/0166529 A1* | 7/2007 | Hsu | ........................ B29C 49/04 264/46.8 |

FOREIGN PATENT DOCUMENTS

| | | |
|---|---|---|
| DE | 1021866 B | 1/1958 |
| DE | 10064801 A1 | 6/2002 |
| DE | 102004061476 A1 | 10/2006 |
| DE | 102006028095 A1 | 12/2007 |
| DE | 102008030318 A1 | 12/2009 |
| DE | 102009030492 A1 | 1/2011 |
| DE | 102012001928 A1 | 8/2013 |
| DE | 1020013203085 A1 | 8/2014 |
| DE | 102017202839 A1 | 8/2018 |
| DE | 102018204145 A1 | 9/2019 |
| EP | 1579980 A1 | 9/2005 |
| EP | 2769825 A1 | 8/2014 |
| JP | S61141527 A | 6/1986 |
| JP | H05237920 A | 9/1993 |

OTHER PUBLICATIONS

Office Action for Chinese Patent Application No. 201980045245.7; dated Jan. 14, 2022.

* cited by examiner

METHOD AND TOOL FOR MANUFACTURING A PLASTIC CONTAINER, IN PARTICULAR A FUEL CONTAINER, BY MEANS OF INTERNAL PRESSURE FORMING

PRIORITY CLAIM

This patent application is a U.S. National Phase of International Patent Application No. PCT/EP2019/067105, filed 27 Jun. 2019, which claims priority to German Patent Application No. 10 2018 211 136.7, filed 5 Jul. 2018, the disclosures of which are incorporated herein by reference in their entireties.

SUMMARY

Illustrative embodiments relate to an improved method and a tool for manufacturing a plastic container, in particular, a fuel container, by internal pressure forming, and, in particular, by blow molding.

BRIEF DESCRIPTION OF THE DRAWINGS

Disclosed embodiments will be explained in more detail below with reference to the drawings. The features shown in the figures and/or the features explained hereunder can be general features of the disclosure and correspondingly refine the disclosure even irrespective of specific combinations of features. In the drawings.

DETAILED DESCRIPTION

Figure 1:
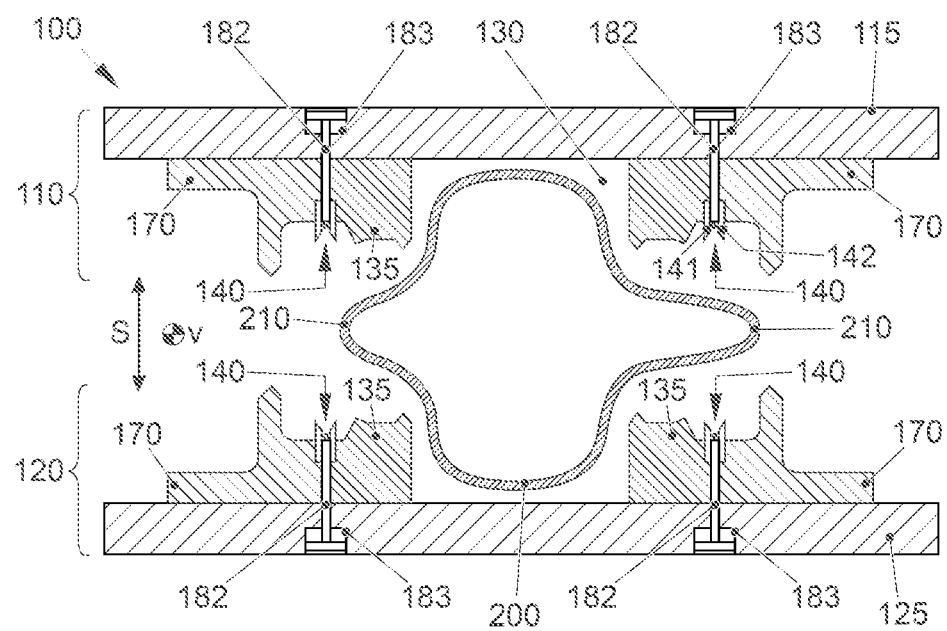
FIG. 1 schematically illustrates a first sectional representation of the manufacture of a plastic container.

In blow molding a heated and, on account thereof, viscous preform of thermoplastic plastic material is inflated with gas, for example, with compressed air, within a shape-imparting blow-molding tool and herein bears on a shape-imparting mold wall or on the internal wall of a mold cavity, respectively. After inflation, the hollow body generated by inflating cools in the tool until the hollow body has sufficient dimensional stability and is able to be demolded. In a common variation of the method, a tubular preform which immediately prior thereto can be generated by extrusion is used (so-called extrusion blow molding).

Plastic containers used for transportation vehicles, such as, fuel containers (fuel tanks), can be manufactured by blow molding. In some instances, various built-in parts such as, for example, filling level sensors, aeration and ventilation elements, pumps, filters, anti-surge baffle walls, valves, fastening elements and similar have to be disposed in the interior of such a plastic container. Current efforts are aimed at incorporating as many built-in parts as possible, or all built-in parts, into the plastic container already during the production of the latter, this requiring that the interior of the container is accessible.

Possibilities to this end are described in patent documents DE 100 64 801 A1, DE 10 2009 030 492 A1, and DE 10 2012 001 928 A1.

Patent documents DE 10 2013 203 085 A1 and EP 2 769 825 A1 which form the closest prior art describe a blow-molding method (and a device) for manufacturing a hollow body, in particular, a fuel container, in which a tubular preform is disposed between two parts of a blow mold, the blow mold is not completely closed, wherein the preform in the region of the ends thereof is closed in a gas-tight manner, and the internal region of the preform is impinged with a gaseous pressurizing medium, on account of which the preform is pushed against internal walls of the blow mold parts and the hollow body is pre-molded. For a simple separation of the preform into two halves to be enabled, it is provided that parts of the preform are gripped by clamping devices which are disposed on the blow mold parts, and the preform is in each case torn into two half parts between the clamping devices. The clamping devices have in each case one clamping member which is displaceable in the opening and closing direction of the blow mold parts, and one detent edge which is disposed so as to be opposite the end side of the clamping member, wherein a groove into which material of the preform is pushed as a bead is formed between the clamping member and the detent edge, and the clamping member or the detent edge is displaced for jamming the material of the preform.

Methods and tools for manufacturing a plastic container, in particular, a fuel container, by internal pressure forming, or blow molding, respectively, are also described in the two as yet unpublished German patent applications 10 2017 202 839.4 and 10 2018 204 145.8 of the present applicant.

In terms of the prior art, reference is furthermore made to patent documents DE 10 2004 061 476 A1 and DE 10 2006 028 095 A1 in which pinch-off edges or demarcation edges, respectively, which are provided by a resistance wire, a heating wire, or a heating strip, or similar, and blades for blow-molding tools are described. Improved severing of excess flash and lost blow-molding dividing heads is made possible by heating the resistance wire, heating wire or the like.

Disclosed embodiments provide an improved method and an improved device (tool) for manufacturing a plastic container by internal pressure forming a tubular preform, the method and the device not having at least one drawback associated with the prior art, or having the at least one drawback only to a minimized extent.

This is achieved by the disclosed method, and by the disclosed molding tool (device), the latter being, in particular, a blow-molding tool, having the features of the coordinate patent claim. The disclosed embodiments are particularly suitable also for manufacturing pressurized fuel tanks for transportation vehicles.

The disclosed method comprises at least the following operations which are to be carried out:

disposing a tubular preform between the mold parts of an (opened) molding tool configured so as to have a mold cavity;

closing the molding tool (by converging the mold parts in a closing direction) and molding or pre-molding from the preform a container by internal pressure, that is to say by generating an internal pressure in the interior region of the preform by way of a gaseous pressurizing medium, wherein an encircling portion of the preform is pushed out of the mold cavity through a mold gap (present, or still present, respectively, between the mold parts);

laterally tearing off the encircling portion (pushed out of the mold cavity), on account of which the container is divided into two container halves;

thermally severing plastic links and/or plastic threads which have been created when laterally tearing off the encircling portion.

For an internal pressure required for molding the container to be able to be generated in the tubular preform, the latter at the axial ends thereof is closed in a gas-tight manner. The tubular preform can be closed in a gas-tight manner, for example, by welding, when the molding tool is being disposed or closed. A closed preform can however also be provided as a prefabricated initial product. A gas (also air) can already be trapped in the closed preform such that an internal pressure which is sufficient for molding the container is generated when the molding tool is closed. However, the internal pressure may be generated by injecting a gaseous pressurizing medium into the interior of the closed preform, in particular, with the aid of at least one blow mandrel. Depending on the further method sequence, the container herein can be substantially completely molded or only pre-molded.

The molded container or the at least pre-molded container (yet to be fully molded at a later stage) is divided into two container halves along the portion which in an encircling manner is pushed out of the mold cavity when closing the mold, in that this portion is laterally torn off, that is to say in a manner transverse to the closing direction or the closing axis, respectively, all around the molding tool, or the mold parts, respectively, toward the outside, that is to say away from the mold cavity, and is at least partially severed herein. The tearing-off can thus also be referred to as tearing-away or severing. (Two optional methods to this end are explained hereunder). The molding tool does not have to be open to this end.

So-called plastic links or webs, respectively, and/or plastic threads can be created when tearing off, on account of which process malfunctions and quality can inter alia arise. A similar fault, referred to as the "formation of threads" or "stringing", now and then arises in the injection-molding of plastics. The disclosed embodiments, therefore, provide that such plastic links and plastic threads, which have unintentionally formed when tearing-off, are thermally severed. This is understood to mean that the plastic links and/or plastic threads are disintegrated (or else destroyed) by a direct thermal influence.

The dividing or separating, respectively, of the molded or pre-molded, respectively, container can take place as follows (optional first method):

closing the molding tool and molding or pre-molding from the preform a container by internal pressure, wherein an encircling portion of the preform is pushed out of the mold cavity through a mold gap and is pushed into a chamber which surrounds the mold cavity and in this chamber is pressed against claw pairs having stationary inner holding claws and movable outer tearing claws; and laterally tearing off the encircling portion by laterally displacing the outer tearing claws, on account of which the encircling portion is torn open between the outer tearing claws and the (stationary) inner holding claws, and the container thus is divided into two container halves. This will yet be explained in more detail hereunder, wherein reference is also made to the corresponding explanations in German patent applications 10 2018 204 145.8, reference thereto being explicitly made.

The dividing or separating, respectively, of the molded or pre-molded, respectively, container can also take place as follows (second method):

closing the molding tool and molding or pre-molding from the preform a container by internal pressure, wherein an encircling portion of the preform is pushed out of the mold cavity through a mold gap and outside the mold cavity is gripped by gripping installations; and laterally tearing off the encircling portion by laterally displacing the gripping installations, on account of which the encircling portion is torn open at at least one tear-away edge of the molding tool and the container is divided into two container halves.

In this context, reference is furthermore made to the corresponding explanations in German patent applications 10 2017 202 839.4, reference thereto being explicitly made.

The lateral displacement of the tearing claws or the gripping installations, respectively, optionally takes place with a closed molding tool. A lateral displacement is understood to mean that the tearing claws or the gripping installations, respectively, are moved transversely to the closing direction or the closing axis, respectively, of the molding tool or the mold parts, respectively. Transverse herein means that the axes of movement of the tearing claws or the gripping installations, respectively, in relation to the closing axis may assume an angle between 45° and 90°, and optionally an angle between 60° and 90°. The tearing claws or the gripping installations, respectively, are moved essentially perpendicularly (90°) to the closing direction. The tearing claws or the gripping installations, respectively, herein are in each case moved away toward the outside, that is to say laterally toward the outside, thus away from the mold cavity.

The thermal severing of the plastic links and/or plastic threads may take place with the aid of at least one hot wire cutting element. A hot wire cutting element is a tensioned piece of wire which is resistance-heated by energizing. The hot wire cutting element is heated to such a degree (for example, up to several hundred degrees Celsius) that the plastic links and/or plastic threads can be cut through by melting or burning in a rapid and locationally targeted manner, wherein the heated or hot, respectively, wire simultaneously functions as a blade or a cutter, respectively. The wire thickness, the wire material, the intensity of the electrical voltage and of the current as well as the heating period can be determined by tests. This principle is known from the prior art and is used, for example, for cutting polystyrene (so-called hot wire cutter). It can be provided, for example, that a robot equipped with a hot wire cutter is used, the robot in the case of an opened molding tool coming in between the mold parts and severing the plastic links and/or plastic threads. It is, however, provided that the molding tool has at least one hot wire cutter, or at least one hot wire cutting element, respectively, by way of which the plastic links and/or plastic threads are severed, in particular, when the molding tool is still closed.

The disclosed method can furthermore comprise some or all of the following operations which are to be carried out subsequent to the preceding operations and, in particular, in this sequence:

opening the molding tool (by diverging the mold parts), wherein a container half remains in each case in the corresponding mold part;

fastening at least one built-in part to at least one of the container halves, in particular, on the internal side;

closing the molding tool once again (by converging the mold parts), wherein the container halves, for example, at peripheries that are hot for fusing, post-heated, or provided with an adhesive, are joined in a materially integral manner so as to form a container or a container bladder, respectively;

optionally blow molding the joined container (by impinging the internal region of the container with a gaseous pressurizing medium), on account of which the container, which up to now has only been pre-molded, is completely fully molded (in that the container is pressed against the internal wall of the mold cavity), that is to say that the final shape of the container to be manufactured is achieved on account thereof (the joining and blow molding can take place successively, simultaneously, or in the case of corresponding sealing also take place in the reverse order);

optionally trimming the container, in particular, with the aid of an encircling cutting installation of the molding tool;

opening the molding tool and demolding the completed plastic container which is provided with at least one built-in part.

When the molding tool is closed once again (for the second time), the mold parts for joining and optionally fully molding or completely molding, respectively, the container may be converged more tightly (second closing position) than in the previous (first) closing action for pre-molding the container (first closing position).

The disclosed method can furthermore subsequently comprise intermediate operations, sub-operations, preparatory operations and/or follow-up operations which are not explained in more detail. The disclosed method may be carried out with the aid of a molding tool or blow-molding tool, respectively, and can therefore comprise the preceding operations:

providing a molding tool or blow-molding tool, respectively.

The molding tool or blow-molding tool, respectively, for manufacturing a plastic container by internal pressure forming or blow molding, respectively, a tubular preform, in particular, by applying the disclosed method, has the following components:

two mold parts (mold halves or mold sides, respectively) which are configured so as to have a mold cavity and are movable relative to one another;

method or mechanism for laterally tearing off (or tearing away or severing, respectively) an encircling portion of the preform which when closing the molding tool (by converging the mold parts) is/has been pushed out of the mold cavity through a mold gap (between the mold parts) which are disposed outside the mold cavity, on account of which a container previously molded or pre-molded (cf. above) between the mold parts can be divided, or is able to be divided, respectively, into two container halves;

at least one hot wire cutter, or at least one hot wire cutting element, respectively, (as has already been explained above) for thermally severing plastic links and/or plastic threads which have been created when laterally tearing off the encircling portion.

The hot wire cutting element may be fastened to deployable tappets. The deployment and retraction movements as well as the electric heating can be controlled by a mold controller or a machine controller.

A single hot wire cutting element that is disposed about the mold cavity, or guided about the mold cavity, respectively, can be provided. A plurality of hot wire cutting elements which are able to be individually controlled or else conjointly controlled and are disposed about the mold cavity can likewise be provided. It may be provided that at least one hot wire cutting element is disposed only in critical regions in which plastic links and/or plastic threads are formed based on experience (alternatively, the hot wire elements disposed therein can also be exclusively operated).

The following method or mechanism for laterally tearing off the encircling portion of the preform may be provided (as also described in German patent applications 10 2018 204 145.8):

at least one chamber (external chamber) which surrounds the mold cavity; and claw pairs which are disposed about the mold cavity in the chamber and have stationary inner (that is to say facing the mold cavity) holding claws and movable, or repositionable, respectively, in particular, laterally movable, outer (that is to say facing away from the mold cavity) tearing claws, such that, by laterally displacing the outer tearing claws, the encircling portion (which when closing the molding tool has been pushed out of the molding cavity through the mold gap) is torn open between the outer tearing claws and the inner holding claws, and the container can be divided, or is able to be divided, respectively, into two container halves.

It may be provided herein that the hot wire cutting element, or the hot wire cutting elements, respectively, is/are disposed between the stationary inner holding claws and the movable outer tearing claws, optionally such that the hot wire cutting element, or the hot wire cutting elements, respectively, is/are disposed directly beside the stationary inner holding claws and (like the stationary inner holding claws) is/are non-displaceable in the lateral direction.

Moreover, the following method or mechanism for laterally tearing off the encircling portion of the preform can also be provided (as also described in German patent applications 10 2017 202 839.4):

at least one tear-away edge which is disposed outside the mold cavity; and a plurality of gripping installations which are disposed outside the mold cavity and are laterally displaceable, by way of which the encircling portion of the preform (which when closing the molding tool has been pushed out of the mold cavity through the mold gap) can be gripped and be torn away at the tear-away edge such that a container previously molded or pre-molded between the mold parts can be divided, or is able to be divided, respectively, into two container halves.

The hot wire cutting element, or the hot wire cutting elements, respectively, is/are suitably disposed in the molding tool, or close to or else directly beside the tear-away edge, respectively.

The blow-molding tool 100 which is only schematically illustrated in FIGS. 1 to 7 has two mold parts or mold halves 110 and 120, respectively, which are movable relative to one another and which are configured so as to have a shape-imparting mold cavity 130. Both mold parts 110 and 120 furthermore have slides 170 which are disposed about the mold cavity 130 and which are laterally displaceable, that is to say transversely to the closing direction S. The blow-molding tool 100 is installed in a blow-molding machine (not shown) so that the mold parts 110 and 120 are vertically aligned (see reference sign v) such that a tubular preform 200 to be inflated can be introduced from above. By virtue of the vertical alignment v, the mold parts 110 and 120 can also be referred to as mold sides.

The disclosed manufacture of a fuel container 260, in particular, of a fuel tank or fuel container, respectively, having built-in parts 250 is described hereunder. The individual operations may be carried out in an automated manner and in a fully automated manner.

Figure 2:
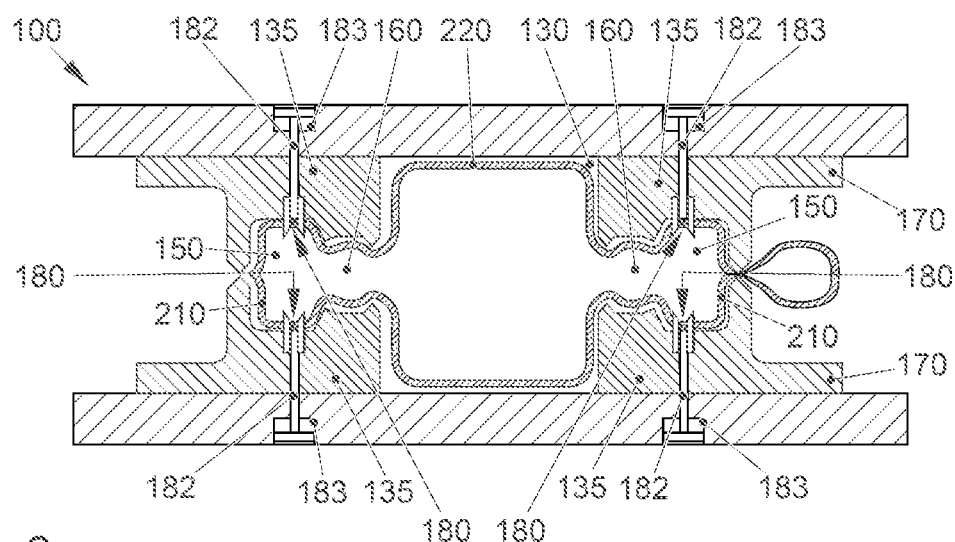
FIG. 2 schematically illustrates a second sectional representation of the manufacture of a plastic container.

At the start of the manufacturing procedure, the directly extruded tubular preform 200 at the axial ends thereof is closed in a gas-tight manner and positioned in the mold cavity 130 between the opened mold parts 110 and 120, as is shown in FIG. 1. The tubular preform 200 is formed from HDPE (high density polyethylene), for example, and is processed in the heated state or in the state still hot for melting. A hollow body is generated from the tubular preform 200 by preliminary blowing, the hollow body being deformed when the blow-molding tool 100 is closed by converging the mold parts 110 and 120, wherein an encircling portion 210 of the preform 200 is pushed out of the mold cavity 130 through a mold gap 160 running all around between the mold parts 110 and 120 and pushed into a chamber which surrounds, or an outer chamber which encircles 150, respectively, the mold cavity 130, as is shown in FIG. 2. A potentially projecting external periphery of the preform 200 herein can be jammed between the slides 170, as is shown in FIG. 2, and herein is removed by being pressed or squeezed, respectively, on account of the corresponding design embodiment of the slides 170.

Once the blow-molding tool 100 has been closed (first closing action) and the mold parts 110 and 120 have assumed the first closing position shown in FIG. 2, the preform 200, or the hollow body formed therefrom, respectively, is blow-molded or inflated, respectively, by impinging the internal region of the preform 200 with a gaseous pressurizing medium, for example, compressed air (for example, by a blow mandrel), on account of which the preform 200 is pushed approximately against the internal wall of the mold cavity 130, a container 220 being pre-molded herein. The encircling portion 210 of the preform 200 that is situated in the chamber 150 herein is also formed by the internal pressure through the mold gap 160, several millimeters wide, between the mold segments or the wall components 135, respectively, and herein is pressed against claw pairs 140 having inner holding claws 141 and outer tearing claws 142, or is blown onto the claws 141 and 142, respectively. The slides 170 form an external mold seal (first sealing plane), which is effective only in this first closing position of the mold, and thus enable a buildup of pressure in the chamber 150.

The claws 141, 142 on both mold parts 110, 120 are disposed laterally about the mold cavity 130, wherein the inner (that is to say facing the mold cavity 130) holding claws 141 are stationary, and the outer (that is to say facing away from the mold cavity 130) tearing claws 142 are movable conjointly with the slides 170. A claw 141, 142 is a projecting element, that is to say an element which protrudes into the chamber 150, which is configured as a rake, claw, blade, or the like, for example. The preform 200 in the respective portion 210 is pressed onto the claws 141, 142 by the effective internal pressure, wherein a form-fit results (in particular, without any perforation associated therewith), for example, in that the plastic material of the preform 200 is pushed over the claws 141, 142 as a bead. On account of the form-fit, tearing forces can be applied to the respective portion 210.

Figure 3:
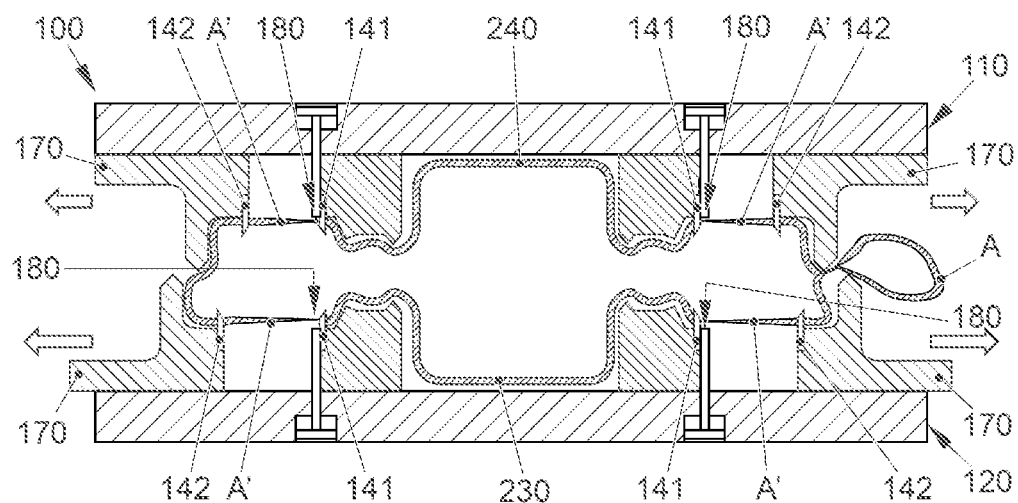
FIG. 3 schematically illustrates a third sectional representation of the manufacture of a plastic container.

In the case of a closed blow-molding tool 100, in particular, when the internal pressure has been released, the slides 170, proceeding from the inner initial position thereof shown in FIG. 2, are now displaced laterally, that is to say transversely to the closing direction S of the mold parts 110 and 120 (see FIG. 1) and toward the outside, that is to say so as to be directed away from the mold cavity 130, this being highlighted by the arrows in FIG. 3. The slides 170 herein have dissimilar displacement paths, this being visualized by dissimilar arrow lengths in FIG. 3. On account of this lateral tearing-off, the encircling portion 210 which is pushed out of the mold cavity 130 is torn open between the moving outer tearing claws 142 and the stationary inner holding claws 141 such that the pre-molded container 220 is divided into two container halves 230, 240. This tearing-off, or tearing-away, respectively, can also be referred to as clawing-away.

Figure 4:
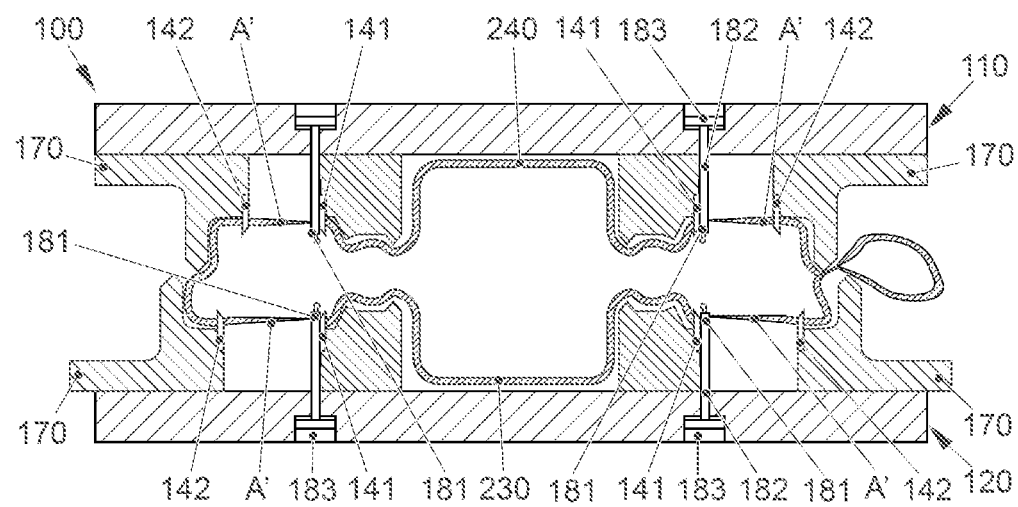
FIG. 4 schematically illustrates a fourth sectional representation of the manufacture of a plastic container.

When tearing off or tearing away, respectively, plastic links and/or plastic threads A' can form on the disconnection points, that is to say that the waste pieces, or the flash A, respectively, torn off or torn away, respectively, are not completely severed. This can impede the further manufacturing procedure. It is therefore provided that such plastic links and/or plastic threads A' are thermally severed. To this end, both mold parts 110, 120 are configured having hot wire cutters 180. The hot wire cutters 180 have hot wire cutting elements 181 (see FIG. 8) which are disposed between the stationary inner holding claws 141 and the movable outer tearing claws 142 and are fastened to deployable tappets 182 (see also FIG. 1). The hot wire cutting elements 181 are deployed in the closing direction S (see FIG. 1), or retracted into the chamber 150, respectively, with the aid of drives 183 and herein sever the plastic links and/or plastic threads A' in a targeted manner such that a complete and clean separation of flash takes place, as is shown in FIG. 4. The hot wire cutting elements 181 are disposed directly beside the inner stationary holding claws 141, this enabling precise severing.

Figure 5:
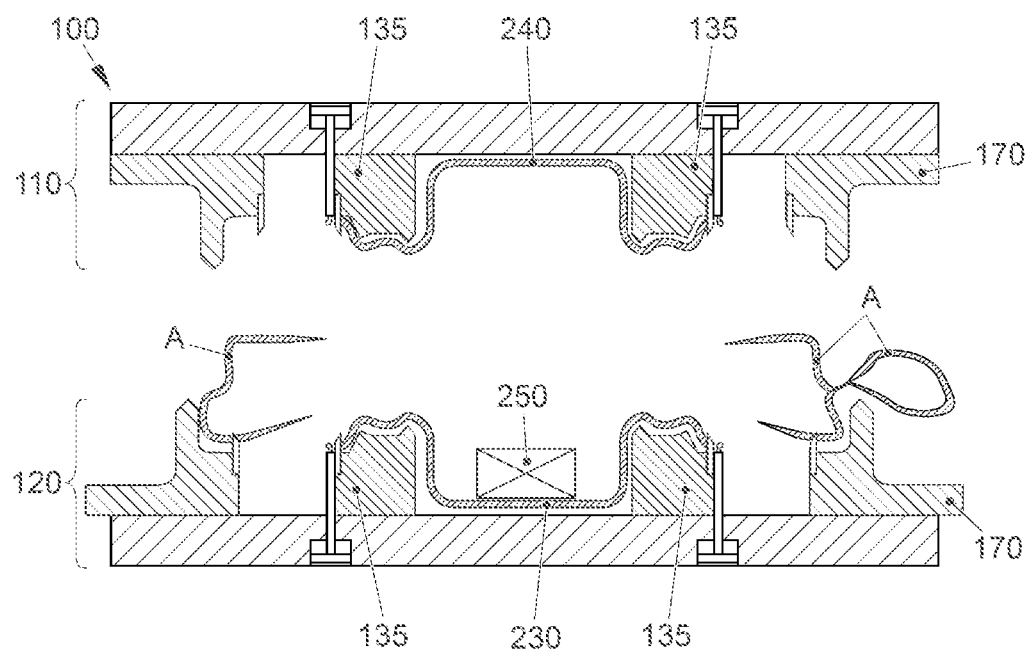
FIG. 5 schematically illustrates a fifth sectional representation of the manufacture of a plastic container.

The hot wire cutters 180 are subsequently moved back. The blow-molding tool 100 is then opened, and the waste pieces A which are torn away and cleanly severed are removed from the blow-molding tool 100, as is shown in FIG. 5. The container halves 230 and 240 remain in the corresponding mold parts 110 and 120. The built-in parts 250 are positioned and fixed to at least one internal side in the interior of the container that is now accessible.

Figure 6:
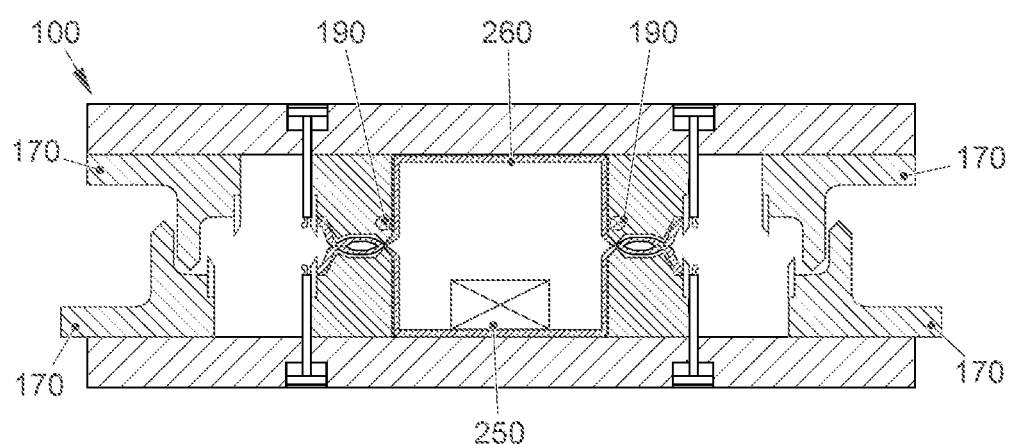
FIG. 6 schematically illustrates a sixth sectional representation of the manufacture of a plastic container.

The blow-molding tool 100 is now closed once again (second closing action), wherein the mold parts 110 and 120 assume a second tighter closing position, as is shown in FIG. 6. This tighter closing position of the mold is enabled by the offset outer terminal position of the slides 170. On account thereof, the mold parts 110 and 120 can be further converged and the mold gap 160 which is still present in the first closing position (see FIGS. 2 to 4) is closed. The mold segments 135 which are still spaced apart in the first closing position now form an internal sealing of the mold (second sealing plane) that is effective only in this second closing position of the mold.

The container halves 230 and 240 are joined to one another as the blow-molding tool 100 is closed once again. To this end, the blow-molding tool 100 can have a heating installation 190 which is configured as a heating wire, for example, with which the peripheries of the container halves 230 and 240 that have to be joined can be post-heated so as to enable joining in a materially and gas-tight manner, wherein other heating and/or connecting possibilities can also be implemented. The now gas-tight container bladder is further inflated by impinging the interior region thereof with a gaseous pressurizing medium, in particular, compressed air (for example, by a blow mandrel) and, so as to follow the mold herein, is pressed against the internal wall of the mold cavity 130, on account of which the two-part container 260 is completely molded.

Figure 7:
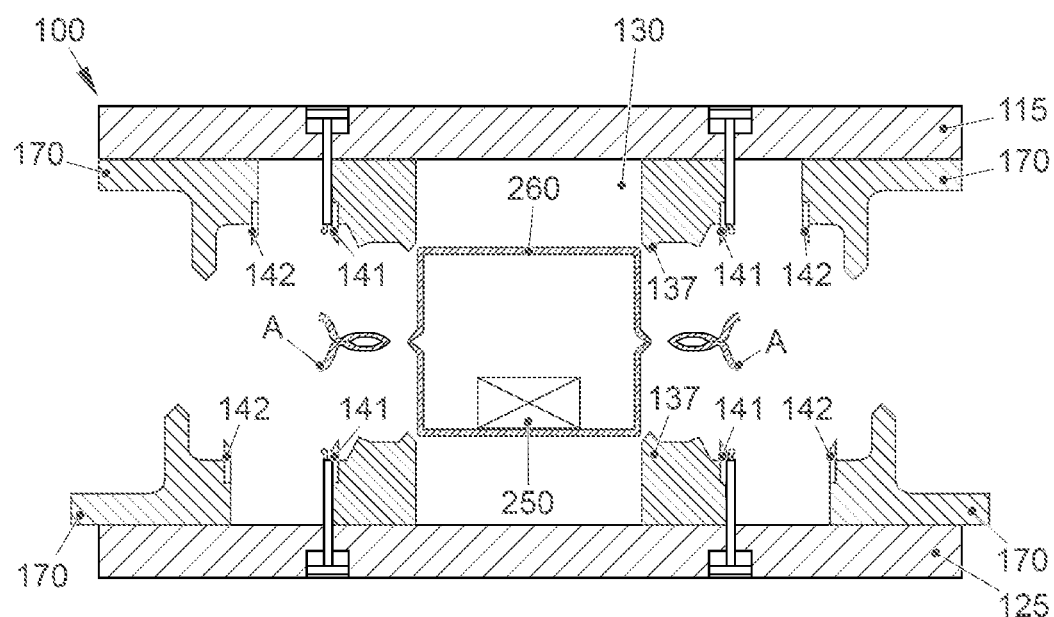
FIG. 7 schematically illustrates a seventh sectional representation of the manufacture of a plastic container.

The manufactured plastic container 260 having the integrated built-in parts 250 cools in the blow-molding tool 100 until the plastic container 260 is sufficiently dimensionally stable and can be demolded after the blow-molding tool 100 has been opened, as is shown in FIG. 7. In the preceding mold closing procedure (see FIG. 6), the manufactured container 260 can furthermore be trimmed with the aid of an integrated cutting or trimming installation 137 (for example, as squeezing edges). The blow-molding tool 100 can have ejectors (not shown) for the container 260 and the waste pieces or flash A, respectively, to be demolded. For manufacturing a further container 260, the slides 170 are now displaced back to the inner initial position thereof (see FIG. 1).

Alternatively to the approach explained above, it can be provided that the container 260 is substantially fully molded or completely molded, respectively, already when the molding tool 100 is closed for the first time, so that the container halves 230, 240 after being equipped with built-in parts 250 are only joined when the molding tool 100 is closed for the second time (with or optionally without an internal pressure).

Alternatively to the approach explained above, it can be moreover provided that only thin spots are generated on account of the lateral tearing-off of the encircling portion 210 (instead of the latter being torn away), the thin spots thereafter being severed with the aid of the hot wire cutters 180.

Figure 8:
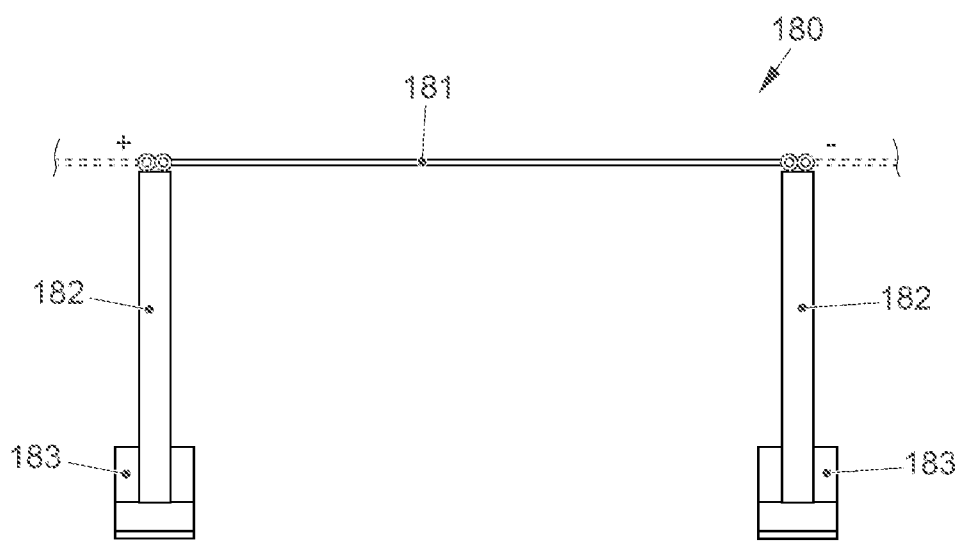
FIG. 8 schematically shows a hot wire cutter.

FIG. 8 schematically shows a hot wire cutter 180 which has a hot wire cutting element 181 that is fastened to two deployable tappets 182, or is clamped therebetween, respectively, the electrical contact for the purpose of resistance heating also taking place by way of the tappets. The tappets 182 are activated with the aid of electric, pneumatic, or hydraulic tappet drives 183 which are controlled by a mold controller or a machine controller. In the case of a corresponding design embodiment, the tappets 182 can simultaneously also function as ejectors. As has already been explained above, a single hot wire cutting element 181 (that is to say only one wire) which by a plurality of tappets 182 that serve as support points, so to speak, is guided around the mold cavity 130, that is to say is configured in an encircling manner, can be provided. A plurality of hot wire cutting elements 181 which are able to be operated in a mutually independent manner and extend in each case between at least two tappets 182 and may be disposed only in critical regions can likewise be provided.

LIST OF REFERENCE SIGNS

100 Blow-molding tool
110 Mold part
115 Base plate
120 Mold part
125 Base plate
130 Mold cavity
135 Mold segment
137 Cutting installation
140 Claw pair(s)
141 Holding claw
142 Tearing claw
150 Chamber
160 Mold gap
170 Slide
180 Hot wire cutter
181 Hot wire cutting element
182 Tappet
183 Tappet drive
190 Heating installation
200 Preform
210 Portion
220 Container
230 Container half
240 Container half
250 Built-in part(s)
260 Plastic container
A Waste piece
A' Plastic links/plastic threads
S Closing direction
v Vertical

The invention claimed is:

1. A method for manufacturing a plastic container by internal pressure forming, the method comprising:
disposing a tubular preform between the mold parts of a molding tool having a mold cavity;
closing the molding tool and molding or pre-molding from the preform a container by internal pressure, wherein an encircling portion of the preform is pushed out of the mold cavity through a mold gap;
laterally tearing off the encircling portion, by which the container is divided into two container halves; and
thermally severing plastic links and/or plastic threads which are created when laterally tearing off the encircling portion.

2. The method of claim 1, further comprising:
closing the molding tool and molding or pre-molding from the preform a container by internal pressure, wherein an encircling portion of the preform is pushed out of the mold cavity through a mold gap and is pushed into a chamber which surrounds the mold cavity and in this chamber is pressed against claw pairs having stationary inner holding claws and movable outer tearing claws; and
laterally tearing off the encircling portion by laterally displacing the outer tearing claws, by which the encircling portion is torn open between the outer tearing claws and the inner holding claws, and the container is divided into two container halves.

3. The method of claim 1, wherein the thermal severing of the plastic links and/or plastic threads takes place with the aid of at least one hot wire cutting element.

4. The method of claim 1, further comprising:
opening the molding tool, wherein a container half remains in each case in the corresponding mold part;
fastening at least one built-in part to at least one of the container halves;
closing the molding tool, wherein the container halves are joined, and blow molding the joined container which herein is completely molded; and
opening the molding tool and demolding the completed container.

5. A molding tool comprising:
a number of mold parts defining a mold cavity for receiving a preform, the mold parts being movable relative to one another between open and closed positions, and defining a mold gap therebetween, wherein the molding tool is configured to tear off an encircling portion of the preform extending through the mold gap from the mold cavity, by which a container molded or pre-molded between the mold parts is divided into at least two container portions; and a number of tearing tools arranged to engage the encircling portion of the preform, the number of tearing tools configured to move away from the mold cavity while the mold parts are arranged in the closed position to tear away the encircling portion.

6. The molding tool of claim 5, wherein a hot wire cutting element is fastened to deployable tappets.

7. The molding tool of claim 5, wherein at least one hot wire cutting element is disposed about the mold cavity for thermally severing plastic links and/or plastic threads.

8. The molding tool of claim 5, wherein at least one hot wire cutting element is disposed only in critical regions in which plastic links and/or plastic threads are formed.

9. The molding tool of claim 5, further comprising:
at least one chamber surrounding the mold cavity; and
wherein the tearing tools comprise claws disposed about the mold cavity in the chamber having stationary inner holding claws and movable outer tearing claws, wherein, by laterally displacing the outer tearing claws, the encircling portion is torn between the outer tearing claws and the inner holding claws, and the container is divided into two container sections.

10. The molding tool of claim 9, wherein a hot wire cutting element is disposed beside the stationary inner holding claws.

11. The molding tool of claim 9, wherein a hot wire cutting element is disposed between the stationary inner holding claws and the movable outer tearing claws.

12. The molding tool of claim 5, the mold parts comprising a number of complementary mold wall segments arranged between the tearing tools and the mold cavity.

13. The molding tool of claim 12, the complementary mold wall segments define the mold gap.

14. A method for manufacturing comprising:
disposing a tubular preform between mold parts of a molding tool within a mold cavity;
closing the molding tool and pressure molding or pre-molding from the preform a container, wherein an encircling portion of the preform extends through a mold gap out from the mold cavity; and
tearing the encircling portion, by which the container forms container portions, while the molding tool is closed.

15. The method of claim 14, further comprising sealing divided container portions into a sealed container.

16. The method of claim 14, wherein tearing includes engaging the encircling portion with a number of claws and moving at least some of the claws to tear the encircling portion.

17. The method of claim 14, further comprising thermally severing plastic links and/or plastic threads near the removed encircling portion.

18. The method of claim 17, wherein thermal severing of the plastic links and/or plastic threads is conduct via at least one hot cutting element.

19. The method of claim 17, further comprising:
opening the molding tool;
fastening at least one built-in part to at least one of the container portions; and
joining the container portions.

* * * * *